Nov. 3, 1936. O. J. OLSON 2,059,482
FEEDER
Filed March 5, 1934
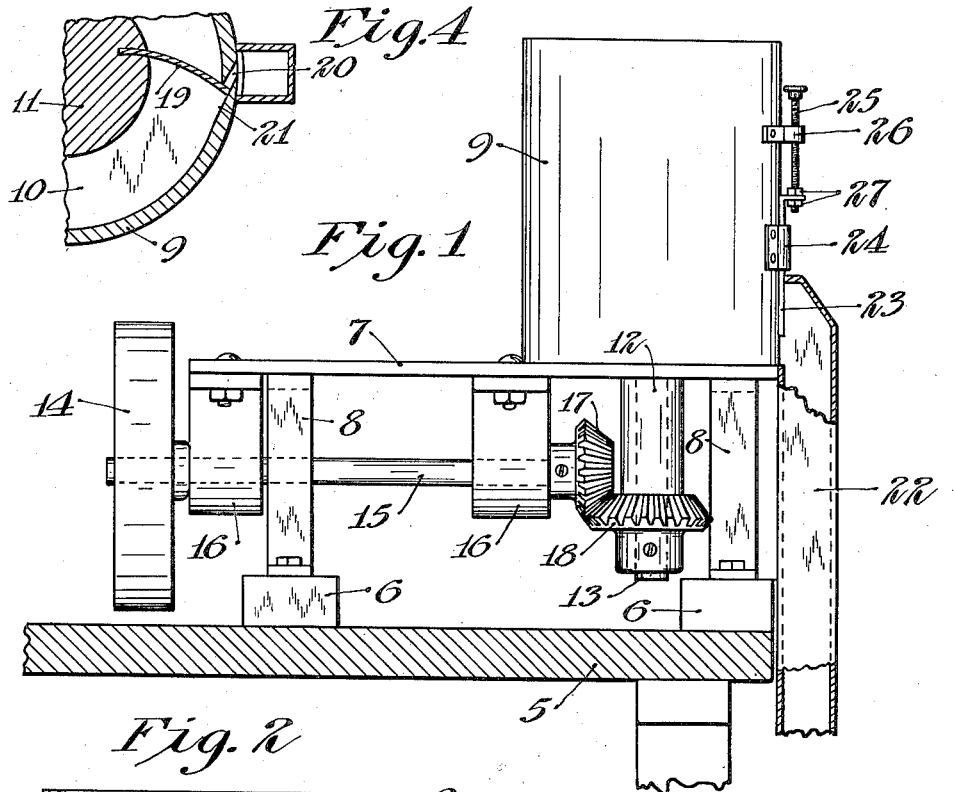
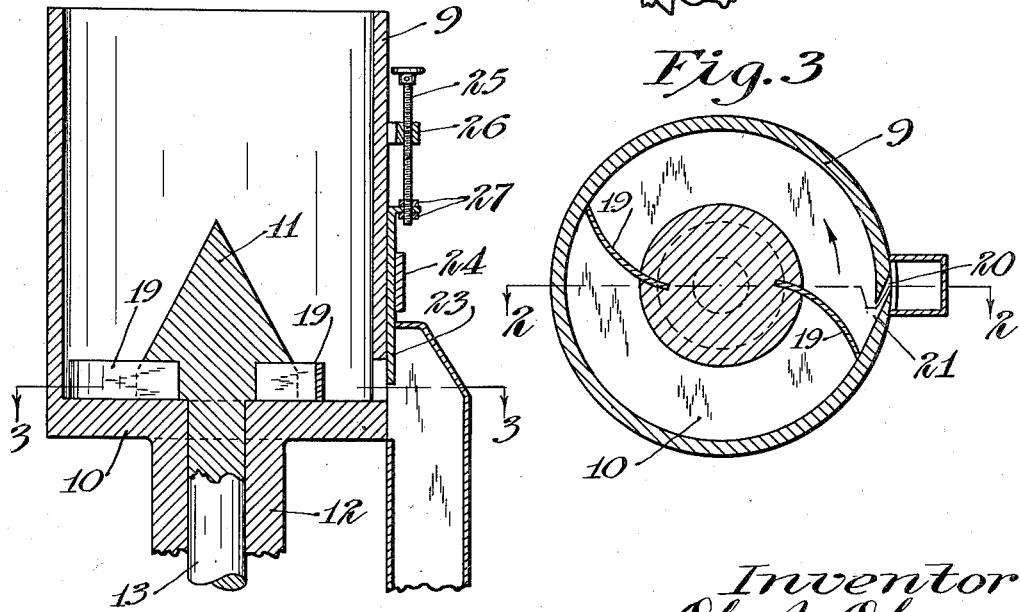
Inventor
Ole J. Olson
By his Attorneys
Williamson & Williamson Patented Nov. 3, 1936

2,059,482

UNITED STATES PATENT OFFICE 2,059,482

FEEDER

Ole J. Olson, Redfield, S. Dak.

Application March 5, 1934, Serial No. 714,062

2 Claims. (Cl. 83—44)

This invention relates to feeders for powdered material.

For certain purposes such as, for example, in feeding bleaching chemicals into flour during the milling process, it is highly desirable that a feeder be provided which will continuously and positively feed powdered material in small accurate amounts.

Generally stated, it is the general object of the present invention to provide a novel and improved feeder for powdered material, which feeder is of cheap and simple construction and can be accurately used for positively feeding the material continuously in never varying predetermined quantity.

To this end, generally stated, the invention consists in the novel parts and novel combinations of parts hereinafter defined in the claims and described in the following specification, made in connection with the accompanying drawing, wherein like reference characters refer to the same or similar parts throughout the various views, and, in which, Fig. 1 is a view in front elevation of a feeder embodying the present invention, some of the parts being broken away and shown in section;

Fig. 2 is a vertical section taken substantially on the line 2—2 of Fig. 3, as indicated by the arrows;

Fig. 3 is a horizontal section taken on the line 3—3 of Fig. 2 as indicated by the arrows; and Fig. 4 is a detailed view showing a portion of one of the sweep arms in sweeping position, relative to the outlet port, for forcing the material therethrough.

Referring to the drawing, there is illustrated a suitable supporting structure 5 upon which cleats 6 are secured. A plate 7 is supported by brackets 8 from the cleats 6 and a cylindrical casing 9 closed at its lower end by a base 10 is mounted on the plate 7 adjacent one end of the same. Disposed within the casing 9 is a head 11 of inverted conical shape, the base of this head lying adjacent and working against the base 10 of the casing. The casing 9 is provided with a downwardly extending tubular bearing portion 12 which extends through the plate 7, joins the base 10 at its central portion and cooperates with the base to form a bearing for a vertical shaft 13 which is formed with or secured to the head 11.

Any suitable mechanism may be provided for driving the shaft 13 to rotate the head 11 and in the embodiment shown this driving mechanism includes a pulley 14 mounted at one end of a shaft 15 journaled in underslung bearings 16 secured to the bottom of the plate 7. This shaft 15 extends to a point adjacent the lower end of the shaft 13 and the shaft 15 carries a beveled pinion 17 meshing with a beveled gear 18 secured to the lower end of the shaft 13 below the tubular bearing portion or sleeve 12. In the illustrated embodiment, the pulley 14 is adapted to be driven as by a belt so that the pulley will rotate in a counterclockwise direction as viewed from the left end of the feeder, as shown in Fig. 1, and accordingly the head 11 will be rotated in a counterclockwise direction when viewed as in Fig. 3, as indicated by the arrow.

Fixed to the lower portion of the head 11 at their inner ends, so as to bear at their lower edges against the base 10 are one or more spring sweep arms 19, two of these sweep arms being shown in the illustrated embodiment. The sweep arms 19 are made of spring steel or analogous material and they bridge the space between the head 11 and the inner surface of the side wall of the cylindrical casing 9 and they resiliently press at their outer ends against the lower portion of the inner surface of this side wall. The outer ends of the spring arms are sprung rearwardly of the inner ends of the arms relative to the direction of rotation of the head 11, so that these sweep arms are under spring tension to press against the inner surface of the side wall of the cylindrical casing 9 and so that the spring arms naturally assume a convex curvature at their advancing sides, as best shown in Fig. 3.

An outlet port 20 of a height slightly greater than the height of the sweep arms 19 is cut through the side wall of the casing 9 near the lower end thereof, so as to oppose the outer ends of the spring arms 19 when the head 11 is rotated to the proper position relative thereto to bring the spring arms adjacent thereto. This outlet port extends substantially tangentially relative to the inner surface of the side wall of casing 9 and projects from the inner surface of the casing to the outer surface of the casing in a forwardly direction relative to the direction of rotation of head 11 and sweep arms 19. This port 20 forms with the adjacent portion of the advancing side of a sweep arm 19 an angle approximating but slightly less than a right angle when the sweep arm is located at a position adjacent the port. It will, of course, be appreciated that the port 20 may be directed through the wall of the casing 9 so as to extend in a slightly different direction than that illustrated if desired. The port 20 forms at the inner surface of the wall of the casing 9 a notch at 21 within which the outer tips of the sweep arms 19 will spring as the head 11 is revolved.

The port 20 discharges into a chute 22 secured as to the casing 9 and this chute may be conveniently used for delivering the powdered or granular material to the point desired. A valve 23 is mounted for vertical sliding movement in a keeper 24 located immediately above the port 20 on the outer wall of the casing 9 and a screw 25 having screw threaded engagement with a bracket 26 projects through an offset portion at the upper end of the valve and this screw is provided with collars 27, one at either side of the offset portion of the valve. The valve works through an opening at the upper end of the chute 22 and by screwing the screw 25 upwardly or downwardly relative to the bracket 26, the valve 23 can be raised or lowered to cover the outlet of the port 20 to a greater or lesser degree, thereby regulating the flow of powdered material through the port.

In operation, powdered material will be placed within the casing 9 and the pulley 14 will be driven as by a belt running from some suitable source of power to rotate the head 11 in a counter clockwise direction, as viewed in Fig. 3. As the head rotates, the powdered material will be worked by the head outwardly from the head into the space adjacent the base 10 between the head and the inner surface of the side wall of the casing 9. The conical formation of the head will cause this action to take place. The sweep arms 19 as they rotate over the base 10 will naturally tend to carry the powdered material outwardly from the center of rotation of the head and as one of the sweep arms arrives at the point where the right hand sweep arm is shown in Fig. 3, relative to port 20, the outer end of this sweep arm will work into the notch 21 and follow along the notch to force a small quantity of the material through the port 20. By reason of the resiliency of the arm, the outer end of the same remains in engagement with the outer surface of the notch so that a direct pushing action on the material to urge the same through the port 20 is created. The material is thus positively fed into the chute 22 through the port 20 by the spring sweep arms 19. The quantity of material fed through the port by each sweep arm 19, as it passes the port, depends upon the size of the port 20 and the position of the valve 23, this valve being capable of being raised or lowered to regulate the discharge through the port. The powdered material ejected through the port 20 will, of course, be carried to the point desired through the chute 22.

The device of the invention is of exceedingly simple construction and is effective for the purposes intended. The feeder has been used successfully for feeding powdered bleaching compounds into flour and it has been found that the feeder can be regulated so accurately that from two ounces to three pounds of the chemical per hour may be fed.

It will, of course, be understood that various changes may be made in the form, details, arrangement and proportions of the various parts without departing from the scope of the present invention.

What is claimed is:—

1. A powder feeder comprising a vertically disposed cylindrical casing having a stationary base closure at its lower end, a conical head working against said base closure, means for revolving said head, one or more spring sweep arms attached at their inner ends to the lower portion of said head and resiliently bearing at their outer ends against the inner surface of said side wall, said side wall having an outlet port therein through which material from within said casing is forced by said sweep arms as said head revolves, said port being of a height to receive partially within the same the outer portions of said sweep arms as the sweep arms are revolved to a position opposite and adjacent said port and said port being substantially tangentially disposed in a forwardly extending direction relative to the circle described by the outer portions of said sweep arms as said head rotates, said sweep arms acting to force the powder from within said casing outwardly through said port in definitely regulated quantity.

2. A powder feeder comprising a cylindrical casing having a stationary base and a side wall, said side wall having a vertically arranged outlet slot therethrough extending substantially tangentially relative to the inner surface of said side wall, the bottom of said slot being in substantially the same plane as the top of the base, a head disposed within said casing of considerably less diameter than the internal diameter of said casing, said head working adjacent said base, means for rotating said head in such direction that portions of said head working most closely adjacent said slot will move in the same general direction as the direction of extension of said slot from the inner surface of said side wall to the outer surface thereof, and a spring sweep arm of less height than the slot carried by said head spanning the space between said head and the inner surface of said side wall and resiliently pressing against said side wall to at times work partially within said outlet slot to force powder from within said casing through said slot.

OLE J. OLSON.